(12) United States Patent
Vainio

(10) Patent No.: US 8,301,630 B2
(45) Date of Patent: Oct. 30, 2012

(54) HANDLING, MANAGEMENT AND CREATION OF ICE CONTACTS

(75) Inventor: Antti Armas Vainio, Kangasala (FI)

(73) Assignee: Core Wireless Licensing S.A.R.L., Luxembourg (LU)

( * ) Notice: Subject to any disclaimer, the term of this patent is extended or adjusted under 35 U.S.C. 154(b) by 473 days.

(21) Appl. No.: 12/004,773

(22) Filed: Dec. 20, 2007

(65) Prior Publication Data

US 2009/0164519 A1    Jun. 25, 2009

(51) Int. Cl.
G06F 7/00 (2006.01)
G06F 17/30 (2006.01)

(52) U.S. Cl. .................. 707/738; 707/793; 707/804
(58) Field of Classification Search ............... 707/104.1, 707/999.107, 736, 737, 738, 793, 803, 804
See application file for complete search history.

(56) References Cited

U.S. PATENT DOCUMENTS

| | | | |
|---|---|---|---|
| 7,466,235 B1* | 12/2008 | Kolb et al. ............... 340/573.1 |
| 7,664,233 B1* | 2/2010 | Kirchmeier et al. ............ 379/37 |
| 2004/0203576 A1 | 10/2004 | Droste et al. ............... 455/404.1 |
| 2005/0288002 A1* | 12/2005 | Sparks et al. ................. 455/418 |
| 2006/0172720 A1 | 8/2006 | Islam et al. ................. 455/404.1 |
| 2006/0198506 A1* | 9/2006 | Miller ....................... 379/210.02 |
| 2007/0243853 A1* | 10/2007 | Bumiller et al. ........... 455/404.1 |
| 2007/0264990 A1 | 11/2007 | Droste et al. .................. 455/418 |
| 2007/0289012 A1 | 12/2007 | Baird ............................. 726/17 |
| 2008/0063152 A1* | 3/2008 | Kraus et al. ..................... 379/39 |
| 2008/0080687 A1 | 4/2008 | Broms ...................... 379/142.02 |
| 2008/0096518 A1* | 4/2008 | Mock et al. ................ 455/404.1 |
| 2008/0115226 A1 | 5/2008 | Welingkar et al. .............. 726/28 |
| 2008/0182621 A1* | 7/2008 | Morman ....................... 455/558 |
| 2008/0184360 A1 | 7/2008 | Kornilovsky et al. .......... 726/17 |
| 2008/0200142 A1 | 8/2008 | Abdel-Kader et al. .... 455/404.2 |
| 2008/0227429 A1 | 9/2008 | Hodgson et al. ........... 455/404.2 |
| 2009/0164467 A1* | 6/2009 | Ala-Lahti ........................ 707/8 |
| 2010/0267357 A1 | 10/2010 | Holmstrom et al. ....... 455/404.1 |

* cited by examiner

Primary Examiner — Wilson Lee
Assistant Examiner — Mark Hershley
(74) Attorney, Agent, or Firm — Harrington & Smith

(57) ABSTRACT

A method includes receiving input at a user equipment that designates a particular entity recorded in a user equipment contacts database as being an entity to be contacted in case of an emergency and setting an indication in a first field of a corresponding contacts database entry, where the first field is separate from a second field of the contacts database entry that stores a name of the entity.

24 Claims, 2 Drawing Sheets

3A: RECEIVING INPUT AT A USER EQUIPMENT THAT DESIGNATES A PARTICULAR ENTITY RECORDED IN A USER EQUIPMENT CONTACTS DATABASE AS BEING AN ENTITY TO BE CONTACTED IN CASE OF AN EMERGENCY

3B: SETTING AN INDICATION IN A FIRST FIELD OF A CORRESPONDING CONTACTS DATABASE ENTRY, WHERE THE FIRST FIELD IS SEPARATE FROM A SECOND FIELD OF THE CONTACTS DATABASE ENTRY THAT STORES A NAME OF THE ENTITY

FIG.3

4A: IN RESPONSE TO PREPARING TO DISPLAY A CONTENT OF A NAME FIELD OF AN ENTRY IN A CONTACTS DATABASE, DETERMINING IF A PREDETERMINED TEXT STRING IS PRESENT IN THE NAME FIELD, THE TEXT STRING INDICATING THAT THE CONTACTS DATABASE ENTRY IS ASSOCIATED WITH ENTITY TO BE CONTACTED IN CASE OF AN EMERGENCY

4B: IF IT IS DETERMINED THAT THE PREDETERMINED TEXT STRING IS PRESENT, DISPLAYING THE CONTENT OF THE NAME FIELD WITHOUT DISPLAYING THE PREDETERMINED TEXT STRING

FIG.4

HANDLING, MANAGEMENT AND CREATION OF ICE CONTACTS

TECHNICAL FIELD

The exemplary and non-limiting embodiments of this invention relate generally to communication systems, methods, devices and computer programs and, more specifically, relate to techniques for managing a contact information in a contacts database of a communication device.

BACKGROUND

ICE (In Case of Emergency) is becoming a de facto standard for using a phone book (contacts) of a mobile communication device (e.g., a mobile phone, also referred to herein as user equipment (UE)) to store the name and number of a person who should be contacted in the case of an emergency.

As is presently known, on most mobile phones one simply need to select 'Contacts', then select 'Add New Contact', then enter the letters 'ICE' next to the name, followed by the telephone number of the named person. It is recommended that both daytime and evening numbers be entered where possible. In the event of an emergency then an emergency responder and/or hospital personnel can then easily determine a person to contact, assuming that the patient has their mobile phone with them.

However, there are several problems inherent in the use of ICE. For example, the user may store the ICE contact by duplicating an existing contact, resulting in two contacts with same number stored in the phonebook (contacts database) of the UE. In this case the UE may not display correct name information when originating/receiving calls and messages to and from that number. In addition, synchronization of the phonebook entries, and updating of the number, then needs to be performed twice. Further by example, the user may add the ICE designation directly to the original phonebook entry. However, in this case the phonebook entries are no longer in alphabetical order according to the actual names of the contacts. Further by example, some users may not be aware of the existence of the ICE concept and, as a result, the ICE number information is not stored in their phonebook.

SUMMARY OF THE EXEMPLARY EMBODIMENTS

In accordance with a first aspect of the exemplary embodiments of this invention a method includes receiving input at a user equipment that designates a particular entity recorded in a user equipment contacts database as being an entity to be contacted in case of an emergency; and setting an indication in a first field of a corresponding contacts database entry, where the first field is separate from a second field of the contacts database entry that stores a name of the entity.

In accordance with a further aspect of the exemplary embodiments of this invention there is provided a computer-readable memory medium that stores program instructions, the execution of which results in operations that comprise receiving input at a user equipment that designates a particular entity recorded in a user equipment contacts database as being an entity to be contacted in case of an emergency; and setting an indication in a first field of a corresponding contacts database entry, where the first field is separate from a second field of the contacts database entry that stores a name of the entity.

In accordance with a further aspect of the exemplary embodiments of this invention there is provided an apparatus that includes a data processor; a user interface; and a memory comprising stored data representing a contacts database. The contacts database comprises a plurality of entries, where each entry comprises a plurality of fields, and where the plurality of fields comprise a name field, a contact field storing information indicating how an entity identified in the name field may be contacted, and a further field indicating whether or not the entity named in the name field is to be contacted in the event of an emergency.

In accordance with a further aspect of the exemplary embodiments of this invention there is provided a computer-readable memory medium that includes stored data representing a contacts database. The contacts database comprises a plurality of entries, where each entry comprises a plurality of fields, the plurality of fields comprising a name field, a contact field storing information indicating how an entity identified in the name field may be contacted, and a field indicating whether or not the entity named in the name field is to be contacted in the event of an emergency.

In accordance with another aspect of the exemplary embodiments of this invention there is provided a method that includes, in response to preparing to display a content of a name field of an entry in a contacts database, determining if a predetermined text string is present in the name field, the text string indicating that the contacts database entry is associated with entity to be contacted in case of an emergency and, if it is determined that the predetermined text string is present, displaying the content of the name field without displaying the predetermined text string.

BRIEF DESCRIPTION OF THE DRAWINGS

The foregoing and other aspects of the exemplary embodiments of this invention are made more evident in the following Detailed Description, when read in conjunction with the attached Drawing Figures, wherein:

FIGS. 3 and 4 each depict a logic flow diagram that illustrates a method, and the result of execution of computer program instructions, by the data processor shown in FIG. 1.

DETAILED DESCRIPTION

The use of the exemplary embodiments of this invention improves/solves the various problems that were discussed above. In addition, the use of the exemplary embodiments of this invention also address and improves/solves a problem related to a variable placement of the ICE contact in the phonebook depending on whether the phonebook is ordered according to first or last names, the time needed to create the ICE contact list, and furthermore enhances the user's awareness of the ICE concept.

Figure 1:
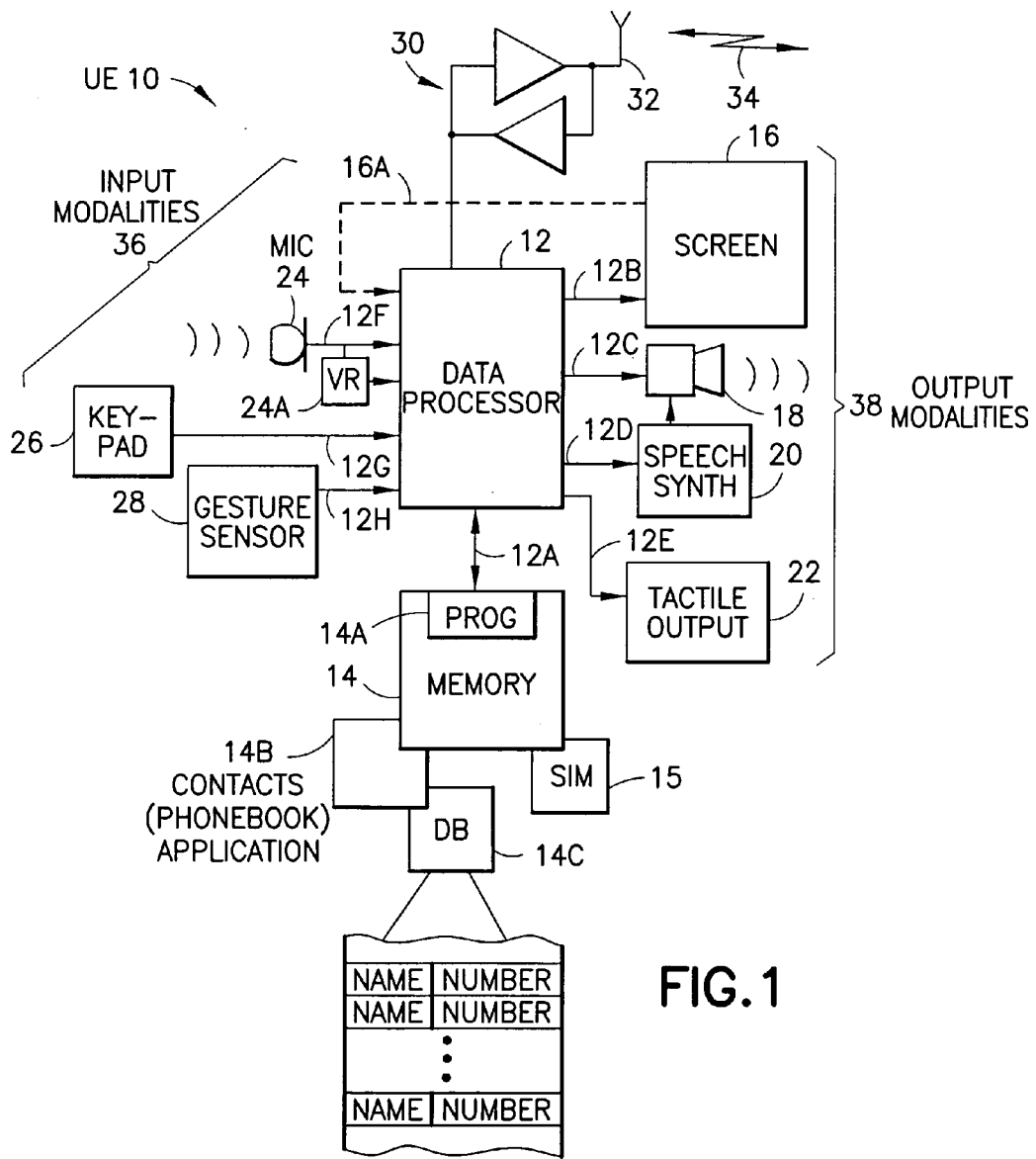
FIG. 1 is a block diagram of a device that is suitable for practicing the embodiments of this invention.

Reference is made to FIG. 1 for illustrating a simplified block diagram of an exemplary embodiment of an electronic device 10, also referred to as a UE, that is suitable for use in practicing the exemplary embodiments of this invention. In FIG. 1 the UE 10 includes a data processor 12 that is coupled through a bus 12A with a memory 14 that stores a program (PROG) 14A of instructions that are executable by the data processor 12. The UE 10 may further include a plurality of input and output devices and subsystems, referred to herein also as input modalities 36 and output modalities 38. As exemplary output devices there may one or more of a visual display screen 16, such as an LCD or a plasma display screen, an acoustic output transducer such as a loudspeaker 18, a speech synthesis subsystem 20 having an output that can be played through the loudspeaker 18 (or through another acoustic output transducer), and a tactile output device or transducer 22, such as a vibratory device (e.g., a piezoelectric transducer). These output devices are coupled to corresponding output paths 12B, 12C, 12D and 12E from the data processor 12. As exemplary input devices there may one or more of an acoustic input transducer such as a microphone 24, an associated speech or voice recognition function (VR) 24A, a keypad or keyboard 26 and a gesture sensor 28, such as a device that is responsive to a rotation about at least one access and/or to a force applied by a user's finger or stylus, such as when making a tapping gesture. These input devices are coupled to corresponding input paths 12F, 12G and 12H to the data processor 12. If the screen 16 is a touch-sensitive screen then there may also be an input 16A from the screen 16 to the data processor 12. In this case the input to the data processor may represent activation of a virtual key or button by the user, as opposed to the use of the keypad/keyboard 26 where the input signal may represent activation of a physical key or button (such as an alphanumeric key or a physical 'soft' key or button). The microphone 24 may be coupled with the speech recognition functionality of the UE 10 (the VR 24A) whereby a word or words spoken by the user can be interpreted by the data processor 12 as representing a command.

It should be appreciated that the data processor block 12 may actually comprise a number of circuit types, in addition to a data processor per se, such as analog-to-digital converters and digital-to-analog converters, that support the operation of the various input modalities 47 and output modalities 48.

In the exemplary embodiments the UE 10 has user communication capabilities, and includes a suitable transceiver 30, such as a radio frequency transceiver coupled with at least one antenna 32 for conducting wireless communications through a bidirectional radio frequency link 34 (e.g., a link to a cellular communication network, or a low power radio frequency link such as a Bluetooth™ link). In other embodiments the transceiver 30 may be optically based and may then include suitable optical source and detector components, such as an infrared emitter and an infrared detector. In other embodiments the transceiver 30 may be adapted for non-wireless communication, such as communication through an optical or electrical conductor (e.g., a cable, a telephone line, or a in general wiring).

It should be noted that the various input modalities 36 and output modalities 38 are exemplary, and not all may be present in a given implementation. For example, the exemplary embodiments of this invention may be used with just the display screen 16 and the keypad/keyboard 26, or with just the display screen 16 if the screen is touch sensitive to permit the user to enter information and commands. In general, those input modalities 36 and output modalities 38 that are actually present in a given embodiment represent a user interface (UI) of the UE 10.

The PROG 14A is assumed to include program instructions that, when executed by the data processor 12, enable the UE 10 to operate in accordance with the exemplary embodiments of this invention, as will be discussed below in greater detail.

In general, the various embodiments of the UE 10 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless or wired Internet access and browsing, as well as portable units or terminals that incorporate combinations of such functions.

The exemplary embodiments of this invention may be implemented by computer software executable by the data processor 12, or by hardware, or by a combination of software and hardware (and firmware).

The memory 14 may be of any type suitable to the local technical environment and may be implemented using any suitable data storage technology, such as semiconductor-based memory devices, flash memory, magnetic memory devices and systems, optical memory devices and systems, fixed memory and removable memory. The removable memory may be embodied in a subscriber identity module (SIM) 15. In general, the SIM 15 includes a computer-readable memory medium that is configurable to be inserted within and withdrawn from the user device, such as the UE 10. The data processor 12 may be of any type suitable to the local technical environment, and may include one or more of general purpose computers, special purpose computers, microprocessors, digital signal processors (DSPs) and processors based on a multi-core processor architecture, as non-limiting examples.

The memory 14 is shown as including computer program code that implements a Contacts (phonebook) application 14B and associated contacts database (DB) 14C. The Contacts application 14B is enhanced in accordance with the embodiments of this invention, as discussed below, to improve the ICE-related usage thereof.

In accordance with the exemplary embodiments of this invention new type information concerning ICE contacts, and the proper handling of ICE contacts of that type, are added to the functionality of the UE 10, more specifically to the Contacts application 14B. The UE 10 allows user to set a particular contact in the Contacts database 14C to be an ICE contact without actually requiring the user to store the 'ICE' abbreviation in the name field. Further, conventional ICE-type information may be insufficient in a case where there are multiple ICE contacts. If a need arises to put the multiple ICE contacts into a priority order, the UE 10 also allows the user to input a precedence (priority order) of the ICE contacts.

As a result, the time needed to input the ICE contacts is decreased as the user need set only one status information indicator, as opposed to writing the ICE abbreviation to the name field.

In this manner there is no need to duplicate the ICE contact and, as a result, no synchronization problems arise between the normal contacts and the ICE contacts since the ICE-related information is stored in one place. In addition, the UE 10 is enabled to display correct name information when originating/receiving calls, messages and other types of communications to/from the number associated with ICE contact, since there are no ICE-related duplicate entries in the phonebook (Contacts database 14C).

When the user defines a contact to be an ICE-type of contact then the UE 10 (the Contacts application 14B) automatically adds the ICE abbreviation to the name when browsing the phonebook 14C. This allows the contact also to be shown in the correct location in the list of contacts according to alphabetical order (whether ordered by first or last names), and without duplicating the contact itself. In the case of multiple ICE contacts, the precedence information may also be stored by the Contacts application 14B which can then be used for showing the ICE contacts in the desired priority order with a correct abbreviation (e.g., ICE1, ICE2, ICE3, etc.).

To enhance the ICE contact list creation, and increase the user's awareness of the ICE concept, the UE 10 implements a guided creation of the ICE contact list, e.g., by prompting the user to select emergency contacts from the contact list, or to input the emergency contacts. There are several options for triggering the ICE contact list creation. As a non-limiting example, a menu selection procedure for the ICE contact list creation may be activated automatically by the occurrence of some event, such as when copying the SIM 15 contacts to contacts database 14C.

The UE 10 may also scan the contact list and, if it detects one or more contacts designated as ICE contacts, it may propose to link them automatically to the corresponding name. This may occur, for example, at least when copying the contact list from the SIM card 15 to the contacts database 14C.

If user inputs a name with an ICE abbreviation associated therewith, the UE 10 may automatically propose to the user to set the contact to be an ICE contact type instead.

Also, when copying the contact list to the SIM card 15 the UE 10 may duplicate the ICE contact so that the ICE-related numbers are also available in the SIM card 15.

Figure 2:
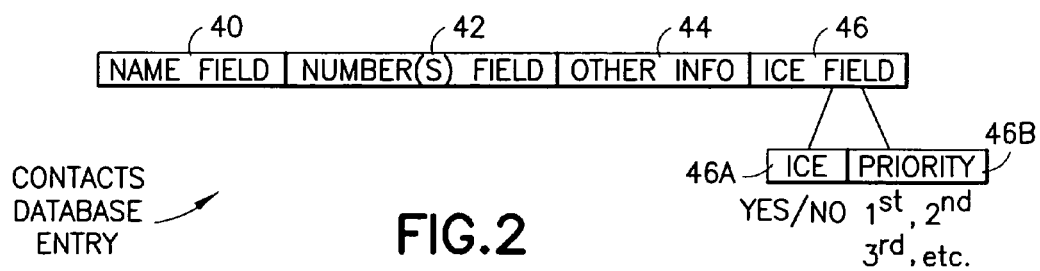
FIG. 2 shows an exemplary format of an entry in a Contacts database shown in FIG. 1, the entry including a field for indicating that a named entity in the entry is one to be contacted in case of an emergency.

Referring to FIG. 2, the exemplary embodiments of this invention may be implemented in at least one aspect thereof by adding a new type field to entries of the phonebook (contacts database 14C), where the new field carries ICE-related information. This information is then used by the Contacts application 14B to correctly handle the ICE-related contact or contacts.

More specifically, assume as a non-limiting case that each entry in the phonebook (contacts database 14C) includes at least a name field 40 (normally for indicating a name of a person, but more generally for indicating the name of any entity that can be contacted), a contact number(s) field 42 (which may include a phone number and/or an email address, or more generally any information needed to contact the entity in the name field 40), and other information fields 44, such as fields that store address information, the person's title, etc., as is conventional. In accordance with aspects of this invention the entry also includes an ICE field 46 that includes at least one bit for indicating whether the entry represents an ICE contact (e.g., the bit is set to "1") or a non-ICE contact (e.g., the bit is set to "0", which may be the default setting). The ICE field 46 may also include one or more bits for encoding an ICE priority (e.g., $1^{st}$, $2^{nd}$, $3^{rd}$, etc., corresponding to, for example, ICE1, ICE2, ICE3, etc.)

Note that in contradistinction to a conventional case, the ICE-related information does not form a part of the name field 40, but instead is segregated into the separate ICE field 46, thereby simplifying the display and management of the ICE-related contacts in accordance with the exemplary embodiments of this invention.

When the Contacts application 14B interacts with a user via the user interface of the UE 10 (e.g., via the display screen 16 and the keypad/keyboard 26) to display one or more contacts, the Contacts application 14B checks the information in the ICE field 46 to determine if the entry is ICE-related and, if it is, may then automatically display the ICE designation with the name, or in any other convenient manner. In this way the displayed entry may visually resemble a conventionally displayed ICE contact, however, the ICE text string does not actually form a part of the name field 40.

In this manner also the user interface of the Contacts application 14B may include an option, such as one displayed as a menu item to the user, to display only ICE-related contacts. In this case the Contacts application 14B need only scan the entries in the contacts database 14C for any entries having an ICE field 46 where the ICE bit is set, and may then display only that entry or entries (in priority order if there are multiple entries). This mode is clearly preferable to the user visually scanning displayed entries, and may facilitate the location of an ICE contact or contacts by an emergency service person.

It is also within the scope of the exemplary embodiments for the user to employ a traditional technique for searching and browsing contacts (i.e., searching by entering, i, ic, ice). In this case the Contacts application 14B would display ICE contacts (in addition to other entries matching the search criteria), as the Contacts application 14B is also aware of the textual representation of the ICE field 46, and it may thus use this information when searching and browsing contacts. That is, in this case the Contacts application 14B would not only search the name field 40 for the matching string, but may also search the ICE field 46.

The user interface of the Contacts application 14B thus also enables the user to review the contact or contacts designated as ICE-related contacts, to change these contacts (delete/add ICE contacts), and to change the priority order of the ICE-related contacts if desired.

The Contacts application 14B may also automatically determine whether a given name field 40 includes a text string "ICE" (or "ICE$", where "$" indicates a 'wildcard' character matched by anything). Preferably the string comparison function is not case sensitive, that is, "ICE" and "ice" and "Ice" are all viewed equivalently. If the ICE text string is found the Contacts application 14B may automatically delete the ICE text string from the name field 40 and update the associated ICE field 46 accordingly. Alternatively, the user may be prompted for permission first. This can be particularly useful when inputting contacts database entries from another source, such as during a synchronization procedure with a PC, or when loading from the SIM 15. The reverse procedure may also be applied, where the Contacts application 14B automatically (or in response to a user prompt) adds an "ICE" text string to the name field 40 when sending an entry to another device (or to the SIM 15) having the ICE field 46 set to indicate that the entry is ICE-related. In this manner compatibility with conventional contact information ICE-designation procedures can be ensured, in the event the receiving device is not compatible with the use of the exemplary embodiments of this invention.

Related to the foregoing paragraph, and in accordance with a further embodiment of this invention, the Contacts application 14B may not use the additional ICE field 46, but may instead just detect the presence in the name field 40 of the text string "ICE" (or "ICE$"). If one is found the Contacts application 14B may then automatically not display the ICE-related text. This can be particularly useful when there is more than one entry having the same name, as the Contacts application 14B when retrieving phonebook information for display to the user can ignore the ICE text string, and display only the correct name information to the user.

It should be noted that in some situations it is still desirable to that the "ICE" text be shown, such as when searching and browsing the contacts database 14C (phonebook) to locate the ICE contacts. As such, the removal of the "ICE" text is useful in some use cases (e.g., receiving calls, etc.), but not for all cases.

Note that this embodiment may be used alone, or in conjunction with the embodiments described before.

FIG. 3 is a logic flow diagram that illustrates a method, and the result of execution of computer program instructions by the data processor 12 shown in FIG. 1. The method includes (Block 3A) receiving input at a user equipment that designates a particular entity recorded in a user equipment contacts database as being an entity to be contacted in case of an emergency; and (Block 3B) setting an indication in a first field of a corresponding contacts database entry, where the first field is separate from a second field of the contacts database entry that stores a name of the entity.

In the method of the preceding paragraph, where the input is received from a user via a user interface of the user equipment, or is received when the contacts database entry is one of received at the user equipment or created at the user equipment.

In the method of the preceding paragraphs, where setting may include initially detecting a text string in the second field that designates the entity as one to be contacted in case of an emergency.

In the method described above, where receiving may occur in response to initially prompting the user to select whether the entity named in the second field is an entity to be contacted in case of an emergency.

In the method of the preceding paragraphs, and further including displaying at least a content of the second field of a particular contacts database entry, determining if the indication is set in the first field and, if it is, also displaying information for identifying the displayed entity name as being an entity to be contacted in case of an emergency.

In the method of the preceding paragraphs, and further including displaying at least a content of the second field of all contacts database entries determined to have the indication set in the first field.

FIG. 4 is a logic flow diagram that illustrates a further method, and the result of execution of computer program instructions by the data processor 12 shown in FIG. 1. The method includes (Block 4A), in response to preparing to display a content of a name field of an entry in a contacts database, determining if a predetermined text string is present in the name field, the text string indicating that the contacts database entry is associated with entity to be contacted in case of an emergency; and (Block 4B) if it is determined that the predetermined text string is present, displaying the content of the name field without displaying the predetermined text string.

The various blocks shown in FIGS. 3 and 4 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations may become apparent to those skilled in the relevant arts in view of the foregoing description, when read in conjunction with the accompanying drawings and the appended claims. As but one example, the use of different, similar or equivalent formats for storing the ICE-related information in the contacts database 14C may be attempted by those skilled in the art. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the examples of this invention may be used to advantage without the corresponding use of other features. As such, the foregoing description should be considered as merely illustrative of the principles, teachings, examples and exemplary embodiments of this invention, and not in limitation thereof.

What is claimed is:

1. A method, comprising:
receiving input at a user equipment that designates a particular entity recorded in a user equipment contacts database as being an entity to be contacted in case of an emergency; and
setting an indication in a first field of a corresponding contacts database entry, where the first field is separate from a second field of the contacts database entry that stores a name of the entity, wherein a first portion of the indication designates the entity named in the second field as one to be contacted in the event of an emergency, and wherein a second portion of the indication further indicates an order of priority according to a user defined precedence for contacting the entity named in the second field to be contacted in the event of an emergency and displaying said named entities in said order,
wherein the first portion of the indication comprises a first bit in the first field, wherein the second portion of the indication comprises at least one second bit in the first field, wherein the first bit indicates whether the entry represents an ICE (In Case of Emergency) contact, and wherein the at least one second bit corresponds to the order of priority of the ICE contact.

2. The method of claim 1, where the input is received from a user via a user interface of the user equipment.

3. The method of claim 1, where the input is received when the contacts database entry is one of received at the user equipment or created at the user equipment.

4. The method of claim 3, where setting comprises initially detecting a text string in the second field that designates the entity as one to be contacted in case of an emergency.

5. The method of claim 1, where receiving occurs in response to initially prompting the user to select whether the entity named in the second field is an entity to be contacted in case of an emergency.

6. The method of claim 1, further comprising displaying at least a content of the second field of a particular contacts database entry, determining if the indication is set in the first field and, if it is, also displaying information for identifying the displayed entity name as being an entity to be contacted in case of an emergency.

7. The method of claim 1, further comprising displaying at least a content of the second field of all contacts database entries determined to have the indication set in the first field.

8. A non-transitory computer-readable memory medium that stores program instructions the execution of which results in operations that comprise:
  receiving input at a user equipment that designates a particular entity recorded in a user equipment contacts database as being an entity to be contacted in case of an emergency; and
  setting an indication in a first field of a corresponding contacts database entry, where the first field is separate from a second field of the contacts database entry that stores a name of the entity, wherein a first portion of the indication designates the entity named in the second field as one to be contacted in the event of an emergency, and wherein a second portion of the indication further indicates an order of priority according to a user defined precedence for contacting the entity named in the second field to be contacted in the event of an emergency and displaying said named entities in said order,
  wherein the first portion of the indication comprises a first bit in the first field, wherein the second portion of the indication comprises at least one second bit in the first field, wherein the first bit indicates whether the entry represents an ICE (In Case of Emergency) contact, and wherein the at least one second bit corresponds to the order of priority of the ICE contact.

9. The computer readable medium of claim 8, where the input is received from a user via a user interface of the user equipment, and wherein the displaying of said named entities in said order is displayed on a display screen of the user equipment.

10. The computer readable medium of claim 8, where the input is received when the contacts database entry is one of received at the user equipment or created at the user equipment.

11. The computer readable medium of claim 10, where setting comprises initially detecting a text string in the second field that designates the entity as one to be contacted in case of an emergency.

12. The computer readable medium of claim 8, where receiving occurs in response to initially prompting the user to select whether the entity named in the second field is an entity to be contacted in case of an emergency.

13. The computer readable medium of claim 8, further comprising displaying at least a content of the second field of a particular contacts database entry, determining if the indication is set in the first field and, if it is, also displaying information for identifying the displayed entity name as being an entity to be contacted in case of an emergency.

14. The computer readable medium of claim 8, further comprising displaying at least a content of the second field of all contacts database entries determined to have the indication set in the first field.

15. An apparatus, comprising:
  a data processor;
  a user interface; and
  a memory comprising stored data representing a contacts database, the contacts database comprising a plurality of entries, each entry comprising a plurality of fields, the plurality of fields comprising a name field, a contact field storing information indicating how an entity identified in the name field may be contacted, and a further field comprising a first portion and a second portion, the first portion indicating whether or not the entity named in the name field is to be contacted in the event of an emergency and the second portion further indicating an order of priority according to a user defined precedence for contacting the entity named in the name field to be contacted in the event of an emergency and displaying said named entities in said order; and
  a display screen, wherein the apparatus is configured to display said named entities in said order on the display screen,
  wherein the first portion comprises a first bit in the further field, wherein the second portion comprises at least one second bit in the further field, wherein the first bit indicates whether the entry represents an ICE (In Case of Emergency) contact, and wherein the at least one second bit corresponds to the order of priority of the ICE contact.

16. The apparatus of claim 15, where said data processor is configurable to receive input from said user interface or from an external device that designates a particular entity recorded in the contracts database as being an entity to be contacted in case of an emergency and, in response, to set an indication in the further field.

17. The apparatus of claim 15, where said data processor is configurable to detect a text string in the further field that designates the entity as one to be contacted in case of an emergency.

18. The apparatus of claim 15, where said data processor is configurable to display at least a content of the name field, to determine from said further field if the entity named in the name field is to be contacted in the event of an emergency, and if so to also display information for identifying the displayed entity name as being an entity to be contacted in case of an emergency.

19. The apparatus of claim 15, where said data processor is configurable to display at least a content of the name field of all contacts database entries where the other field indicates that the entity named in the name field is to be contacted in the event of an emergency.

20. A non-transitory computer-readable memory medium, comprising stored data representing a contacts database, the contacts database comprising a plurality of entries, each entry comprising a plurality of fields, the plurality of fields comprising a name field, a contact field storing information indicating how an entity identified in the name field may be contacted, and a further field comprising a first portion and a second portion, the first portion indicating whether or not the entity named in the name field is to be contacted in the event of an emergency, where the second portion further indicates an order of priority according to a user defined precedence for contacting the entity named in the name field to be contacted in the event of an emergency and displaying said named entities in said order, wherein the first portion of the further field comprises a first bit indicating whether the entry represents an ICE (In Case of Emergency) contact, and wherein the second portion of the further field comprises at least one second different bit corresponding to the order of priority of the ICE contact.

21. The computer-readable memory medium of claim 20, where said memory medium is embodied within a user communication device.

22. The computer-readable memory medium of claim 20, where said memory medium is configurable to be inserted within and withdrawn from a user communication device.

23. A method, comprising:
    in response to preparing to display a content of a name field of an entry in a contacts database, determining if a predetermined text string is present in the name field, the text string indicating that the contacts database entry is associated with entity to be contacted in case of an emergency;
    determining if an indication of an order of priority according to a user defined precedence for contacting the entity named in the name field to be contacted in the event of an emergency is present;
    if it is determined that the predetermined text string is present, displaying the content of the name field without displaying the predetermined text string; and
    if it is determined that the indication of the order of priority according to a user defined precedence is present, displaying the content of the name field in the order of priority without displaying the indication of the order of priority;
    wherein the indication comprises a first portion and a second portion, wherein the first portion of the indication comprises a first bit in a first field of the contacts database entry, wherein the second bit in the first field, wherein the first bit indicates whether the entry represents an ICE (In Case of Emergency) contact, and wherein the at least one second bit corresponds to the order of priority of the ICE contact.

24. The method of claim 23, executed in a user communication device.

* * * * *

UNITED STATES PATENT AND TRADEMARK OFFICE
CERTIFICATE OF CORRECTION

PATENT NO. : 8,301,630 B2
APPLICATION NO. : 12/004773
DATED : October 30, 2012
INVENTOR(S) : Antti Armas Vainio It is certified that error appears in the above-identified patent and that said Letters Patent is hereby corrected as shown below:

Claim 16, col. 10, line 35 delete "contracts" and insert --contacts--.

Claim 23, col. 12, line 12 delete "bit" and insert --portion of the indication comprises at least one second bit--.

Signed and Sealed this
Fifth Day of February, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,301,630 B2 | Page 1 of 1 |
| APPLICATION NO. | : 12/004773 | |
| DATED | : October 30, 2012 | |
| INVENTOR(S) | : Vainio | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 657 days.

Signed and Sealed this
Fifth Day of April, 2016

Michelle K. Lee
*Director of the United States Patent and Trademark Office*